(12) United States Patent
Zhai

(10) Patent No.: US 9,943,927 B2
(45) Date of Patent: Apr. 17, 2018

(54) TRANSIENT LIQUID PHASE JOINING OF DISSIMILAR MATERIALS

(71) Applicant: ArvinMeritor Technology, LLC, Troy, MI (US)

(72) Inventor: Yang Zhai, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 352 days.

(21) Appl. No.: 14/558,128

(22) Filed: Dec. 2, 2014

(65) Prior Publication Data

US 2016/0151854 A1    Jun. 2, 2016

(51) Int. Cl.
*B23K 20/00* (2006.01)
*B32B 15/01* (2006.01)
(Continued)

(52) U.S. Cl.
CPC ............ *B23K 20/12* (2013.01); *B23K 11/04* (2013.01); *B23K 11/20* (2013.01); *B23K 20/02* (2013.01); *B23K 20/16* (2013.01); *B23K 20/227* (2013.01); *B23K 28/00* (2013.01); *C22C 19/03* (2013.01); *C22C 37/10* (2013.01); *C22C 38/002* (2013.01); *C22C 38/04* (2013.01); *H05B 6/02* (2013.01); *B23K 2203/04* (2013.01); *B23K 2203/06* (2013.01); *B23K 2203/18* (2013.01)

(58) Field of Classification Search
CPC ........ B23K 20/12; B23K 11/20; B23K 11/04; B23K 28/00; B23K 20/02; B23K 20/16; B23K 20/227; B23K 2203/18; B23K 2203/06; B23K 2203/08; H05B 6/02; C22C 19/03; C22C 37/10; C22C 38/04; C22C 38/002

USPC .............. 219/686, 162, 602–603, 607, 610, 219/615–617, 137 WM, 146.1; 228/223, 228/256, 56.3, 112, 114, 122, 222, 254, 228/248.1, 119, 218, 122.1; 428/615, 428/387, 660; 257/621

See application file for complete search history.

(56) References Cited

U.S. PATENT DOCUMENTS 4,005,988 A       2/1977  Paulonis et al.
4,890,782 A *    1/1990  Nakai ................. B23K 31/025
                                                                228/114

(Continued)

FOREIGN PATENT DOCUMENTS

CN              1394978 A       2/2003
CN            101223001 A       7/2008

(Continued)

OTHER PUBLICATIONS

Translate JP2003200272A, Method of Forming Metal Joined Body, Aug. 15, 2003, Espacenet, https://worldwide.espacenet.com/publicationDetails/biblio?11=1&ND=3&adjacent.*

(Continued)

*Primary Examiner* — Quang Van
(74) *Attorney, Agent, or Firm* — Brooks Kushman P.C.

(57) ABSTRACT

A method of joining dissimilar materials that may include a first part made of cast iron and a second part made of a metal alloy that is not made of cast iron. An insert material may be disposed between the first part and the second part. The insert material may be heated such that at least a portion of the insert material forms a transient phase liquid and bonds to the first part and the second part.

16 Claims, 2 Drawing Sheets

(51) Int. Cl.
| | |
|---|---|
| B23K 31/02 | (2006.01) |
| B23K 1/19 | (2006.01) |
| B23K 20/12 | (2006.01) |
| B23K 20/227 | (2006.01) |
| B23K 11/20 | (2006.01) |
| B23K 11/04 | (2006.01) |
| H05B 6/02 | (2006.01) |
| B23K 28/00 | (2006.01) |
| C22C 19/03 | (2006.01) |
| C22C 37/10 | (2006.01) |
| C22C 38/04 | (2006.01) |
| C22C 38/00 | (2006.01) |
| B23K 20/02 | (2006.01) |
| B23K 20/16 | (2006.01) |
| B23K 103/06 | (2006.01) |
| B23K 103/18 | (2006.01) |
| B23K 103/04 | (2006.01) |

(56) References Cited

U.S. PATENT DOCUMENTS

| | | | | |
|---|---|---|---|---|
| 5,873,703 | A * | 2/1999 | Kelly | B23K 1/0018 228/119 |
| 7,518,082 | B2 | 4/2009 | Helgee et al. | |
| 2005/0098609 | A1* | 5/2005 | Greenhut | B23K 35/001 228/122.1 |
| 2008/0224271 | A1* | 9/2008 | Sogawa | H01L 21/76898 257/621 |
| 2008/0318078 | A1* | 12/2008 | Matsubara | B23K 9/235 428/615 |
| 2009/0001141 | A1* | 1/2009 | Spriestersbach | B23K 1/005 228/223 |
| 2012/0248176 | A1* | 10/2012 | Herron | B23K 35/0244 228/248.1 |
| 2015/0044505 | A1* | 2/2015 | Nishikawa | B32B 15/016 428/660 |

FOREIGN PATENT DOCUMENTS

| | | |
|---|---|---|
| CN | 101374631 A | 2/2009 |
| CN | 101966629 A | 2/2011 |
| DE | 102011077562 A1 | 12/2012 |
| EP | 0157625 A2 | 10/1985 |
| JP | S6240981 A | 2/1987 |
| JP | H08276281 A | 10/1996 |
| JP | H1147954 A | 2/1999 |
| JP | 2003200272 A | 7/2003 |
| JP | 20100073452 A | 4/2010 |

OTHER PUBLICATIONS

Cook, Grant O., III, et al., Overview of Transient Liquid Phase and Partial Transient Liquid Phase Bonding, J. Mater Sci. May 7, 2011, pp. 5305-5323, vol. 46, Utah.

Kodentsov, A.A., Transient Liquid Phase Bonding as a Potential Substitute for Soldering with High-Lead Alloys, pp. 1-62, Laboratory of Materials and Interface Chemistry, Eindhoven University of Technology, The Netherlands.

Macdonald, W.D., et al., Transient Liquid Phase Bonding, Annu. Rev. Mater. Sci., Department of Materials Science and Eng., Massachusetts Institute of Tech., Massachusetts, 1992, pp. 23-46, vol. 22.

Atabaki, M. Mazar, et al., Effect of Heating Rate on the Partial Transient Liquid Phase Diffusion Bonded Al/Mg2Si Metal Matrix Composite and Magnesium Alloy (AZ91D) Couple, Assoc. of Metallurgical Engineers of Serbia, Jul. 11, 2011, pp.

http://www.permanent---magnets.com/permanentmagnetsblog/296, The Principle and Application of Transient Liquid Phase Diffusion Bonding, May 5, 2014, pp. 1-3.

Macdonald, W.D., et al., Transient Liquid Phase Bonding Processes, Department of Materials Science and Eng., Massachusetts Institute of Tech., Massachusetts, The Metal Science of Joining, The Minerals, Metals & Materials Society, 1992, pp. 93-100.

Atabaki, M. Mazar, et al., Transient Liquid Phase Diffusion Bonding of Stainless Steel 304, Assoc. of Metallurgical Engineers of Serbia, Scientific Paper UDS: 669.14.018.8, Apr. 5, 2012, pp. 177-186.

Sermin Ozan, et al., "The Effect of the Process Temperature on the Bondability in Transient Liquid Phase (tlp) Diffusion Bonding of AISI 430 Ferritic Stainless Steel with Nodular (Spheroid) Cast Iron Using a Copper Interlayer", Received: Dec. 17, 2004, Accepted: May 6, 2015, Faculty of Technical Education, Department of Metallurgy, Firat University Elazig 23119, Turkey et al.

European Patent Office, Extended European Search Report for the corresponding European Patent Application No. 15193598.8 dated May 3, 2016.

Japanese Patent Office, Japanese Office Action for the corresponding Japanese Patent Application No. 2015-203389 dated Oct. 5, 2016.

Japanese Patent Office, Japanese Office Action Translation for the corresponding Japanese Patent Application No. 2015-203389 dated Oct. 5, 2016.

The State Intellectual Property Office of China, Chinese Office Action for the corresponding Chinese Patent Application No. 201510616964.3 dated Jul. 4, 2017.

* cited by examiner

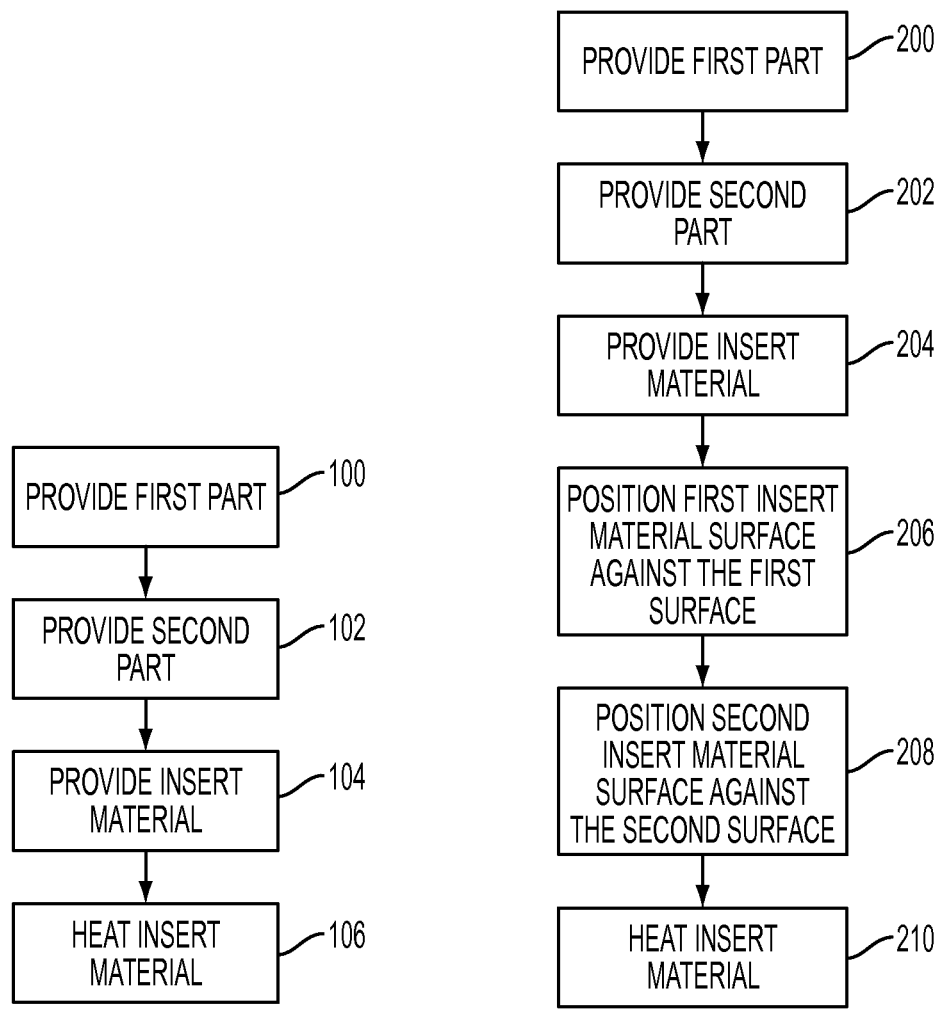

# TRANSIENT LIQUID PHASE JOINING OF DISSIMILAR MATERIALS

TECHNICAL FIELD

This patent application relates to transient liquid phase joining of dissimilar materials in which one component is a cast iron component.

BACKGROUND

A method for arc welding of ductile cast iron is disclosed in U.S. Pat. No. 7,518,082.

SUMMARY

In at least one embodiment, a method of joining dissimilar materials is provided. The method may include providing a first part made of cast iron and providing a second part made of a metal alloy that is not made of cast iron. The method may further include providing an insert material that may be disposed between and may engage the first part and the second part. The method may still further include heating the insert material such that the insert material forms a transient phase liquid and bonds to the first part and the second part. The first part and the second part may not melt when the insert material is heated.

In at least one embodiment, a method of joining dissimilar materials is provided. The method may include providing a first part that may be made of cast iron and that may have a first surface. A second part may be provided that may be made of steel and that may have a second surface. An insert material may be provided that may have a first insert material surface and a second insert material surface disposed opposite the first insert material surface. The first insert material surface may be positioned against the first surface. The second insert material surface may be positioned against the second surface. The insert material may be heated such that the insert material becomes a first transient phase liquid at the first insert material surface and a second transient phase liquid at the second insert material surface. The first transient phase liquid may bond to the first part. The second transient phase liquid may bond to the second part. The first part and the second part may not melt when the insert material is heated and the insert material bonds to the first part and the second part.

BRIEF DESCRIPTION OF THE DRAWINGS

FIGS. 3A and 3B are flowcharts of methods of joining dissimilar materials.

DETAILED DESCRIPTION

Figures 1A, 1B:
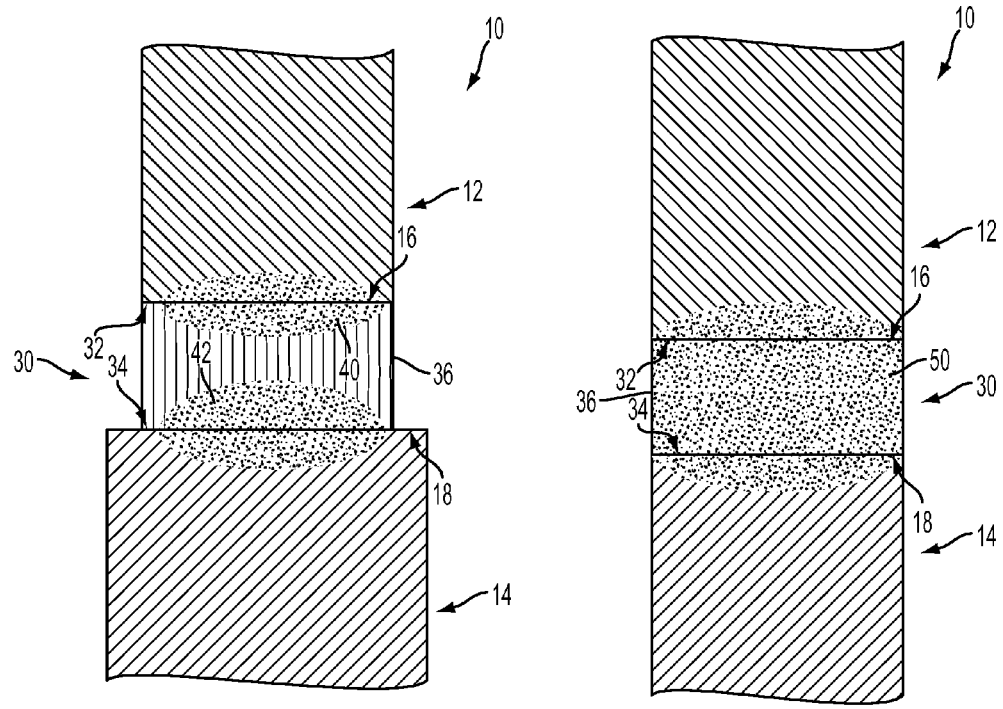
FIGS. 1A and 1B are cross-sectional views of exemplary axle components including an insert material.
Figure 2:
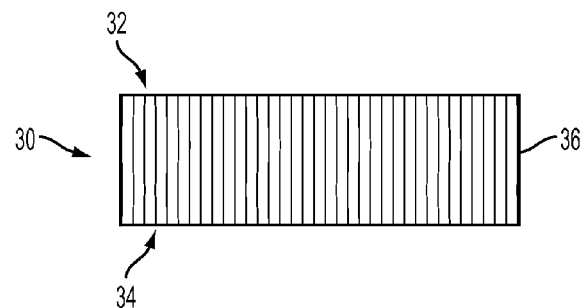
FIG. 2 is a cross-sectional view of an insert material.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Axle components may be made of a high strength cast iron due to the ability of high strength cast irons to endure the high stresses and cyclic loading that may be experienced by axle components. The use of a high strength cast iron may enable the creation of the complex shapes of axle components and may reduce machining processes employed in order to achieve the desired shape. Axle components that may be subject to high stresses and cyclic loading may include axle housings, drum brake assemblies, carrier assemblies, brake calipers, etc.

High strength cast irons may contain carbon and silicon, the concentrations of which may impact the strength and ductility of the high strength cast iron. The carbon and silicon content of the high strength cast iron may impact the ability to weld accessories or other components to the axle components to form an axle assembly.

Some examples of high strength cast irons may include, gray cast iron, ductile cast iron, nodular cast iron, and compacted graphite iron. These high strength cast irons may be referred to as flowable cast irons. Material compositions of select flowable cast irons are shown in Table 1 below. Iron and/or residual elements may make up most of the balance of the material composition and is not listed in Table 1 for brevity.

TABLE 1

Material Composition of Various Cast Irons

| Family | Carbon (wt %) | Silicon (wt %) | Manganese (wt %) | Sulfur (wt %) | Phosphorous (wt %) |
|---|---|---|---|---|---|
| Gray Cast Iron | 2.5-4.2 | 1.0-3.0 | 0.15-1.0 | 0.02-0.25 | 0.02-1.0 |
| Ductile Cast Iron | 3.0-4.0 | 1.8-3.0 | 0.10-1.0 | 0.01-0.03 | 0.01-0.1 |
| Nodular Cast Iron | 3.2-4.1 | ≤2.75 | ≤0.5 | ≤0.025 | ≤0.08 |
| Compacted Graphite Iron | 2.5-4.0 | 1.5-3.0 | 0.10-1.0 | 0.01-0.03 | 0.01-0.1 |

Gray cast iron is a type of cast iron that may contain a graphitic microstructure. The graphite may be in a flake form and stabilized by the silicon, which may inhibit the development of iron carbides. The graphite in flake form in gray cast iron may result in greater dissolving or diffusing of the graphite throughout the gray cast iron. The dissolving or diffusing of the graphite flakes may result in brittle areas in a part made of gray cast iron.

Ductile cast iron is a type of cast iron that contains a graphitic microstructure. The graphite may be in spheroidal form. The addition of manganese or magnesium may enable the graphite to take the spheroidal form. The spheroidal microstructure may provide a greater strength and enhance ductility as compared to gray cast iron.

Nodular cast iron is similar to ductile cast iron that contains a nodular graphitic microstructure. The addition of manganese or magnesium may enable the graphite to take the nodular form. The nodular microstructure may provide a greater strength and enhance ductility as compared to gray cast iron.

Compacted graphite iron (CGI) is a type of cast iron that contains a graphitic microstructure. The graphite may be in a blunt flake or semi-nodular form. The semi-nodular microstructure may provide strength and ductility intermediate to gray cast iron and ductile cast iron.

Steel may be used to form an axle subcomponent or an accessory component. The steel component may be joined to the axle component to form an axle assembly by a joining process. The accessory components may be brackets, housing snorkels, and other mounting components.

The steel axle subcomponent or accessory component may be made of low carbon steel. Examples of low carbon steels may have material compositions as shown in Table 2 below. Iron and/or residual elements may make up the balance of the material composition and is not listed in Table 1 for brevity.

TABLE 2

Material Compositions of Various SAE Grades

| SAE Grade | Carbon (wt %) | Manganese (wt %) | Phosphorus (wt %) | Sulfur (wt %) |
| --- | --- | --- | --- | --- |
| 1006 | 0.08 | 0.35 max | 0.04 | 0.05 |
| 1008 | 0.1 | 0.30-0.50 | 0.04 | 0.05 |
| 1010 | 0.08-0.13 | 0.30-0.60 | 0.04 | 0.05 |
| 1020 | 0.18-0.23 | 0.30-0.60 | 0.04 | 0.05 |

Welding steel components to cast iron components may present challenges that may affect the strength of the base cast iron material. The heat produced from the welding process may further dissolve or diffuse the graphite microstructure of the cast iron component. The dissolving or diffusing may result in the formation of carbides, martensite, cementite, or bainite proximate the weld zone. The formations that include cementite may be referred to as "white cast iron". These formations may reduce the strength of the parts made of cast iron. Therefore, industry standards generally warn against the welding of cast irons without extensive and expensive welding operations, due to the potential loss of its original strength.

A possible solution to obviate the challenges presented in welding cast iron parts is to provide an insert material disposed between the steel component and the cast iron component and perform a low temperature metallurgical joining process. The insert material may be a low melting point material that may be configured to generate or form a transient liquid phase between the steel component and the cast iron component when the low temperature metallurgical joining process is employed.

The low temperature metallurgical joining process may enable the joining of components made of dissimilar materials at a temperature less than is associated with traditional welding processes. The low temperature metallurgical joining process may join the cast iron component to the steel component without negatively affecting the material properties of the steel component or the cast iron component.

The low temperature metallurgical joining process may be a transient liquid phase diffusion bonding process that may result in solid-state diffusion bonding and may utilize inductive heating, resistive heating, or frictional heating. The process may melt at least a portion of the insert material and reduce heat effects to the steel component and to the cast iron component to be joined, or may reduce insert-base metal interactions.

At least a portion of the insert material may melt to become a thin transient liquid phase interlayer. The portion of the insert material may melt at a lower temperature than the components made of dissimilar materials such as a cast iron component and a steel component. As such, the melting temperature may be a temperature lower than the solidus temperature of the steel component or the cast iron component.

In the transient liquid phase, a layer or portion of the insert material may liquefy and diffuse into voids or gaps within the steel component or the cast iron component. The transient liquid phase may diffuse into the steel component and/or the cast iron component as the transient liquid phase spreads along an interface between the insert material and the components to the joined. The temperature applied to the steel component and the cast iron component may be held constant, and the thin transient liquid phase interlayer may isothermally solidify to join the components together.

The transient liquid phase bonding may rely on solid state diffusion of the transient liquid phase into the steel component and the cast iron component that remain in a solid state. Maintaining a combination of the steel component, the cast iron component, and the insert material at a constant elevated temperature, the transient liquid phase of the insert material may diffuse away from the joint and into the steel component and the cast iron component, that remain in a solid state. The solid state diffusion of the transient liquid phase may continue until solid state equilibrium has been achieved, upon which the transient liquid phase may re-solidify at the constant elevated temperature.

The re-solidification of the transient liquid phase may result in a high quality and homogeneous bond having a structure similar to that of the steel component or cast iron component. Additionally, the transient liquid phase bonding process may result in a bond between the steel component and the cast iron component having a melting temperature similar to that of the joined materials. As isothermal solidification occurs, the solidus temperature of the insert material may rise and approach the solidus temperature of the steel component or the cast iron component. This may improve the service temperature or operating temperature of the resulting assembly of the joined steel component and cast iron component such that the temperatures that the resulting assembly may encounter and endure during operation may be significantly higher than the bonding temperature to join the steel component to the cast iron component.

Transient liquid phase bonding differs from conventional brazing. For example, traditional brazing processes may result in alloying between a filler material and the components to be joined. The alloying between the filler material and the components may dissolve or change the composition of the components to be joined. In addition, dissolving may result in erosion of the material or mechanical properties of the joined components. The resultant joint may also be more brittle as compared to the joint created using transient liquid phase bonding due to the non-uniform distribution of the filler material (heterogeneous bond) between the components. In addition, the filler material may reduce the overall service temperature of the joined components. More specifically, the overall service temperature of the resulting assembly of the joined components may be equal to or less than the melting temperature of the filler material.

Unlike transient liquid phase bonding, traditional brazing processes may also require that a protective atmosphere or flux be applied to the components to be joined. The protective atmosphere or flux may prevent the formation of oxides while the components are heated.

The insert material employed in a transient liquid phase joining process may be a metal alloy that differs from the cast iron component and the steel component. The insert material may be a metal alloy containing nickel. The nickel composition may affect the melting temperature (liquidus temperature) of the insert material, e.g., the higher the nickel composition of the insert material, the higher the melting temperature of the insert material. The insert material metal alloy may include nickel in the range of approximately 5.0%-20.0% by weight.

The nickel composition of the insert material may have solubility with the cast iron component and the steel component, such that the nickel may diffuse within the components. The nickel composition may have significant solid state diffusivity at the bonding temperature which may improve the mechanical properties and corrosion resistance of the iron component and the steel component.

As diffusion occurs between the insert material and the base metals during transient liquid phase joining, the mechanical properties of the cast iron component and the steel component may change. For example, mechanical properties, such as strength and ductility, may be improved by a combination of solid solution strengthening and grain refinement or grain boundary strengthening by the nickel composition. The nickel composition may improve the structure and the size of the grains of the base metals. The nickel composition may aid in forming a corrosion-resistant layer.

Referring to FIG. 1A, a cross-sectional view of an axle assembly component 10 is shown. The axle assembly component 10 may include a first part 12 made of cast iron and a second part 14 made of a metal alloy. The metal alloy may be a low carbon steel. The first part 12 may be an axle component, such as a suspension system, an axle housing, a drum brake assembly, a carrier assembly, a brake caliper, etc. The second part 14 may be an accessory component, such as a bracket, snorkel, or other mounting component.

The first part 12 may have a first surface 16. The first surface 16 may be referred to as a first joining surface or first faying surface. The second part 14 may have a second surface 18. The second surface 18 may be referred to as a second joining surface or second faying surface.

The axle assembly component 10 may further include an insert material 30. The insert material 30 may completely separate the first part 12 from the second part 14 prior to a metallurgical joining process being employed to heat the insert material 30.

The insert material 30 may have a first insert material surface 32 and a second insert material surface 34. The second insert material surface 34 may be disposed opposite the first insert material surface 32. The first insert material surface 32 may be configured to abut against or engage the first surface 16 of the first part 12. The second insert material surface 34 may be configured to abut against or engage the second surface 18 of the second part 14.

In at least one embodiment, the first insert material surface 32 may have a length and/or width such that a surface area of the first insert material surface 32 may be roughly equal to a surface area of the first surface 16. The second insert material surface 34 may have a length and/or width such that a surface area of the second insert material surface 34 may be roughly equal to a surface area of the second surface 18.

The insert material 30 may have a height or thickness that may extend along an exterior surface 36 that may extends from the first part 12 to the second part 14. The thickness of the insert material 30 may be determined based on a wall thickness of the steel components and the cast iron components to be joined and the desired resulting joint properties after transient liquid phase joining. The thickness of the insert material 30 may be based on the liquidus temperature of the insert material 30 due to the nickel content of the insert material 30, the bonding temperature, the time to heat the insert material from a first temperature or initial temperature to the bonding temperature or the liquidus temperature, the surface area of the faying surfaces of the first part 12 and the second part 14, and the surface area of the insert material 30.

The insert material 30 may be positioned relative to the first surface 16 of the first part 12 and/or relative to the second surface 18 of the second part 14. The insert material 30 may be provided in various forms. The insert material 30 may be provided as a separate component such as a thin foil, a filament/wire, an interlayer, a tape, or a preform such as a stamped wafer, washer, or sheet. An insert material 30 provided as a separate component may be disposed between and may engage the first surface 16 of the first part 12 and the second surface 18 of the second part 14.

The insert material 30 may also be applied as a film, coating, paste, powder, or spray to at least one of the first part 12 or the second part 14. The insert material 30 applied as a film or coating may be dipped, brushed, or sprayed onto an end surface of at least one of the first part 12 and the second part 14. The insert material 30 may be disposed on an end surface of the first part 12 before the insert material 30 engages the second part 14, or vice versa.

In at least one embodiment, the insert material 30 may be applied to an end surface of at least one of the first part 12 or second part 14 by a bonding process such as cladding. The insert material 30 may be bonded to the first part 12 or the second part 14 by pressing or rolling the insert material 30 onto a surface of the first part 12 or the second part 14.

In at least one embodiment, the insert material 30 may be a metal alloy in powder form. The powdered insert material may be injected or dispensed proximate desired joint area, such as proximate an end surface of the first part 12 or the second part 14. A heat source, such as a laser, may melt the powder as the powder is deposited onto the end surface. The powdered insert material may also be cold powder sprayed onto the first surface 16 of the first part 12 and/or the second surface 18 of the second part 14 and may bond to the first part 12 or second part 14. The powdered insert material may be applied using thermal spraying methods including powder coating, flame spraying, cold spraying, warm spraying, or other overlay spray coatings.

In at least one embodiment, the first surface 16 of the first part 12 or the second surface 18 of the second part 14 may be cleaned prior to applying the insert material 30 to the surface. The first part 12 or the second part 14 may be preheated to a preheat temperature. Once the first part 12 or the second part 14 reaches the preheat temperature, the insert material 30 may be powder sprayed onto the surface up to a desired insert material thickness. Alternatively, the preheated first part 12 or second part 14 may be dipped into a powder or liquid solution containing the insert material 30 to achieve an insert material thickness greater than a threshold thickness.

The preheating of the first part 12 or the second part 14 may enable the insert material 30 to more effectively bond or adhere to the surface and may allow the insert material 30 to be provided with a substantially uniform thickness. The coated first surface 16 of the first part 12 and/or second surface 18 of the second part 14 may undergo a subsequent heat treat or curing steps.

After disposing the insert material 30 onto first surface 16 of the first part 12 and/or the second surface 18 of the second part 14, the first part 12 and the second part 14 may be abutted or positioned proximate each other. Next, the insert material 30 may be heated to bond the first part 12 to the second part 14 or to bond the first part 12 to the insert material 30 and the second part 14 to the insert material 30.

The insert material 30 may be heated by a variety of methods such that at least a portion of the insert material 30 becomes a transient liquid phase. As shown in FIG. 1A, at least a portion of the insert material 30 disposed proximate the first insert material surface 32 may become a first transient liquid phase 40. At least a portion of the insert material 30 disposed proximate the second insert material surface 34 may become a second transient liquid phase 42.

The first transient liquid phase 40 may interact with the first surface 16 of the first part 12. The first transient liquid phase 40 may fill voids or gaps between first insert material surface 32 and the first surface 16 of the first part 12. The first transient liquid phase 40 may solid state diffuse into the first part 12 and isothermally solidify to bond to the first part 12.

The second transient liquid phase 42 may interact with the second surface 18 of the second part 14. The second transient liquid phase 42 may fill voids or gaps between the second insert material surface 34 and the second surface 18 of the second part 14. The second transient liquid phase 42 may solid state diffuse into the second part 14 and isothermally solidify to bond to the second part 14.

In at least one embodiment, the first transient liquid phase 40 and the second transient liquid phase 42 may not extend to the exterior surface 36 of the insert material 30. In addition, the first transient liquid phase 40 may be completely spaced apart from the second transient liquid phase 42. As such, a portion of the insert material 30 disposed between the first transient liquid phase 40 and second transient liquid phase 42 may not melt or become a transient liquid phase.

Referring to FIG. 1B, an axle assembly component 10 is shown in which substantially all of the insert material 30 may melt and become a transient liquid phase 50. The transient liquid phase may diffuse into the first part 12 and the second part 14. The solid state diffusion of the transient liquid phase 50 into the first part 12 and the second part 14 may produce a nearly invisible joint between the first part 12 and the second part 14 after isothermal solidification.

To facilitate a projection electrical resistance heating process, the insert material 30, the first surface 16 of the first part 12, the second surface 18 of the second part 14, or the first insert material surface 32, or the second insert material surface 34 may be provided with at least one projection. A first electrode may be positioned relative to the first part 12 and aligned with the projection. A second electrode may be positioned relative to the second part 14 and aligned with the projection.

During a projection resistance heating process, an electrical current may pass from the first electrode to the second electrode. The heat generated by the current passing through the first part 12, the second part 14, and the insert material 30 may collapse or melt the at least one projection. The passing of the current through the at least one projection may result in at least a portion of the insert material 30 that may be disposed proximate the first insert material surface 32 becoming the first transient liquid phase 40 and at least a portion of the insert material 30 disposed proximate the second insert material surface 34 becoming the second transient liquid phase 42.

In at least one embodiment, an induction welding process may be employed. An induction coil or contact head may be disposed proximate the first part 12 or the second part 14. The induction coil may generate an electromagnetic field that may act on the insert material 30. The induction coil may induce a current in the insert material 30 to resistively heat at least one of the first insert material surface 32 and the second insert material surface 34.

The heat generated by the electromagnetic field may melt at least a portion of the first insert material surface 32 such that the portion becomes the first transient liquid phase 40. The heat generated by the electromagnetic field may melt at least a portion of the second insert material surface 34 such that the portion becomes the second transient liquid phase 42.

In at least one embodiment, a friction welding process may be employed. The friction welding process may translate the first part 12 relative to the second part 14 such that the insert material 30 is heated. The friction generated by the relative motion of the first part 12 to the second part 14 may heat an interface between the first surface 16 of the first part 12 and the first insert material surface 32 and/or an interface between the second surface 18 of the second part 14 and the second insert material surface 34.

Irrespective of the heating process employed to heat the insert material 30, the first surface 16 of the first part 12 and the second surface 18 of the second part 14 may not melt as the insert material 30 is heated at least to the bonding temperature or liquidus temperature and bonds to the first surface 16 and the second surface 18. Additionally, the first part 12 and the second part 14 may not melt as the insert material 30 is heated at least to the bonding temperature or liquidus temperature and bonds the first part 12 to the second part 14.

Referring to FIG. 3A, an exemplary method of joining components made of dissimilar materials is shown.

At block 100, the first part 12 may be provided. The first part may be made of cast iron.

At block 102, a second part 14 made of a metal alloy may be provided. The second part 14 may be an accessory or other axle component made of a metal alloy that is not cast iron.

At block 104, an insert material 30 may be provided. The first part 12 and the second part 14 may be disposed within a fixture such that first surface 16 is spaced about from the second surface 18 and the insert material 30 may be disposed between the first part 12 and the second part 14. A first insert material surface 32 may engage the first surface 16 of the first part 12. A second insert material surface 34 may engage the second surface 18 of the second part 14. The insert material 30 may completely separate the first part 12 from the second part 14 before heating of the insert material 30 by a low-temperature joining process is employed.

At block 106, the insert material 30 may be heated. The insert material 30 may be heated such that at least a portion of the insert material 30 becomes a transient liquid phase. The transient liquid phase may solid state diffuse into the first part 12 and the second part 14, such that the transient liquid phase bonds the first part 12 to the second part 14. The first part 12 and the second part 14 may not melt when the insert material 30 is heated. The resulting assembly may subsequently be allowed to cool.

Referring to FIG. 3B, another method of joining components made of dissimilar materials is shown.

At block 200, a first part 12 may be provided in a similar manner as block 100.

At block 202, a second part 14 may be provided in a similar manner as block 202.

At block 204, an insert material 30 may be provided in a similar manner as block 104.

At block 206, the first insert material surface 32 may be positioned against the first surface 16 of the first part 12.

However, the first part 12 may be preheated to a preheat temperature before the first insert material surface 32 may be positioned against the first surface 16 of the first part 12.

At block 208, the second insert material surface 34 may be positioned against the second surface 18 of the second part 14. However, the second part 14 may be preheated to a preheat temperature before the second insert material surface 34 may be positioned against the second surface 18 of the second part 14.

At block 210, the insert material 30 may be heated by an external heat source (e.g., torch, resistive heating, etc.) such that a portion of the first insert material surface 32 disposed against the first surface 16 becomes a first transient liquid phase 40 at the first insert material surface 32 and a portion of the second insert material surface 34 disposed against the second surface 18 becomes a second transient liquid phase 42 at the second insert material surface 34 as described above. The first transient liquid phase 40 may bond to the first part 12. The second transient liquid phase 42 may bond to the second part 14. The first transient liquid phase 40 and/or the second transient liquid phase 42 may extend to and beyond an exterior surface 36 of the insert material. The first part 12 and the second part 14 may not melt when the insert material 30 is heated or when the first transient liquid phase and second transient liquid phase of the insert material 30 bonds to the first part 12 and the second part 14.

Various embodiments may include associated advantages. For example, transient liquid phase joining process may enable larger gaps between cast iron and steel parts as compared to brazing since brazing may rely on the phenomenon of capillary action to distribute a filler material between the components to be joined and thus may require a very small gap between the components. The tensile strength of the resulting joint formed by a brazing process may be sensitive to the gap between the components to be joined, i.e., the larger the gap, the lower the tensile strength of the resulting joint.

The insert material employed in the transient liquid phase joining process may have a smaller cross-section or thickness as compared to a filler material that may be employed in a traditional brazing process for the same size joint gap. The thinner insert material allows for lower costs due to less insert material being required to perform such a joining process.

The composition and method of application of the insert material may enable the effective joining of steel components with cast iron components axle components. The transient liquid phase joining may enable the resulting joint to exhibit the mechanical properties of the base metals, steel and cast iron, while inhibiting intermetallic formations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of joining dissimilar materials comprising:
   providing a first part made of cast iron, the first part having a first surface;
   providing a second part made of steel, the second part having a second surface;
   providing an insert material having a first insert material surface and a second insert material surface disposed opposite the first insert material surface;
   positioning the first insert material surface against the first surface and positioning the second insert material surface against the second surface; and
   heating the insert material such that the insert material becomes a first transient liquid phase at the first insert material surface and the first transient liquid phase bonds to the first part and the insert material becomes a second transient liquid phase at the second insert material surface and the second transient liquid phase bonds to the second part;
   wherein the first part and the second part do not melt when the insert material is heated and the insert material bonds to the first part and the second part and the first and second transient liquid phases are completely spaced apart from each other.

2. The method of claim 1 wherein the insert material is made of an insert material metal alloy that differs from cast iron and differs from the steel of the second part.

3. The method of claim 1 wherein the insert material completely separates the first part from the second part before heating the insert material.

4. The method of claim 1 wherein heating the insert material includes induction heating the first part, the second part, and the insert material.

5. The method of claim 1 wherein heating the insert material includes electrical resistance heating of the first part, the second part, and the insert material.

6. The method of claim 1 wherein heating the insert material includes friction welding.

7. The method of claim 1 wherein the insert material is sprayed on the first part.

8. The method of claim 1 wherein the insert material is a film that is disposed on the first part before the insert material engages the second part.

9. The method of claim 1 wherein the insert material is a powder disposed on the first surface of the first part prior to engaging the insert material against the second surface the second part.

10. The method of claim 1 wherein the insert material is a powder disposed on the first part and on the second part, wherein the powder on the first part engages the powder on the second part when the first part and second part are engaged.

11. The method of claim 1 wherein the first transient liquid phase and the second transient liquid phase do not extend to an exterior surface of the insert material that extends from the first part to the second part.

12. The method of claim 1 wherein a portion of the first insert material surface that is disposed against the first surface becomes the first transient liquid phase.

13. The method of claim 1 a portion of the second insert material surface that is disposed against the second surface becomes the second transient liquid phase.

14. The method of claim 1 wherein heating the insert material includes preheating the first part before heating the insert material.

15. The method of claim 1 wherein the first part is an axle assembly housing and the second part is a mounting bracket.

16. The method of claim 1 wherein the insert material completely separates the first part from the second part.

* * * * *

UNITED STATES PATENT AND TRADEMARK OFFICE
CERTIFICATE OF CORRECTION

PATENT NO. : 9,943,927 B2
APPLICATION NO. : 14/558128
DATED : April 17, 2018
INVENTOR(S) : Yang Zhai Page 1 of 1

It is certified that error appears in the above-identified patent and that said Letters Patent is hereby corrected as shown below:

In the Claims

Column 10, Line 41, Claim 9:
After "against the second surface"
Insert -- of --.

Column 10, Line 54, Claim 13:
After "The method of claim 1"
Insert -- wherein --.

Signed and Sealed this
Seventeenth Day of July, 2018

Andrei Iancu
*Director of the United States Patent and Trademark Office*